as-is# 3,480,591
POLYMERS CONTAINING N-ALKOXYMETHYL GROUPS

Günter Oertel, Cologne-Flittard, Hans Holtschmidt, Leverkusen-Steinbuechel, Kuno Wagner, Leverkusen, and Karl-Friedrich Zenner, Cologne-Flittard, Germany, assignors to Farbenfabriken Bayer Aktiengesellschaft, Leverkusen, Germany, a corporation of Germany
No Drawing. Filed Feb. 2, 1966, Ser. No. 524,467
Claims priority, application Germany, Feb. 3, 1965, F 45,132
Int. Cl. C08g 22/02, 22/04
U.S. Cl. 260—75                                   3 Claims

ABSTRACT OF THE DISCLOSURE

Self-cross-linkable polymers are prepared by reacting organic compounds containing active hydrogen atoms that are reactive with NCO groups with an alkoxymethyl isocyanate.

---

This invention relates to an improved method of making N-alkoxymethyl groups containing polymers.

It is known that N-methylol groups can be introduced into high molecular weight compounds containing amide groups by the action of formaldehyde or compounds giving off formaldehyde and that the resulting products can be cross-linked, if desired, in the presence of acid catalysts.

However, such condensation products are not stable on storage because a cross-linking process takes place even without the addition of acids or the action of elevated temperature, and this, in many cases, leads to insoluble or unmeltable products which cannot be subsequently formed.

To overcome these disadvantages, processes have been described according to which high molecular weight products containing amide groups are first converted into N-methylol compounds by means of formaldehyde and are then converted into N-alkoxymethyl compounds by means of alcohols.

The cross-linkable high molecular weight compounds contain stable N-alkoxymethyl groups instead of the unstable N-methylol groups mentioned above. However, the introduction of N-alkoxymethyl groups into high molecular weight compounds by this condensation reaction which is generally termed α-amino-alkylation involves considerable technical difficulties. In this procedure, it is necessary to work in the presence of water or alcohols (which are also formed in the course of the condensation) and of alkaline and acid catalysts. Isolation of the condensation products generally proceeds first via separation of salts or salt solutions. Many sensitive high molecular weight compounds, for example, those containing reactive end groups such as isocyanate, epoxy or nitrile groups or sensitive chain members such as acetal groups in the molecule are decomposed under the conditions of this condensation or at least strongly modified in their properties.

Moreover, such formaldehyde condensations with high molecular weight compounds do not proceed uniformly. In many cases, unwanted chain lengthening or cross-linking occurs even during the first stage of condensation, namely the addition of formaldehyde to the amide groups, due to the N-methylol groups reacting, immediately they have been formed, with an adjacent amide group, splitting off water and forming a methylene-bis-amide group, before they can be blocked in the second stage of condensation by condensation with an alcohol.

It is therefore an object of this invention to provide an improved process for the production of cross-linkable high molecular weight polymerization, polycondensation and poly-addition products containing N-alkoxymethyl groups.

The foregoing objects and others which will become apparent from the following description are accomplished in accordance with the invention generally speaking by reacting an organic compound having a molecular weight of at least 600 and containing active hydrogen atoms, which are reactive with NCO groups and are determinable by the Zerewitinoff test with an alkoxy-methylisocyanate.

The process according to the invention avoids all the difficulties and disadvantages of the known processes by enabling a "Mannich group," i.e. the N-alkoxymethyl group, to be introduced not by a two-stage condensation reaction, but by a simple addition reaction. It is possible by this method to convert any products which contain amide groups, even those which also contain groups that are sensitive to water, acids or bases in the molecule, into cross-linkable products which are stable on storage.

The superiority of the process of the invention lies, however, not only in the technical advance in the conversion of high molecular weight compounds containing amide groups into the corresponding products which contain N-alkoxymethyl groups, but above all in the much wider field of possible applications.

Thus, for example, it is not possible to produce N-alkoxymethyl groups in high molecular weight compounds containing primary or secondary amino groups by the action of formaldehyde and subsequent condensation with alcohols. In contrast to amide groups, basic amino groups react immediately with formaldehyde to form N-methylene compounds or hexahydrotriazine derivatives, so complete cross-linking of the high molecular weight compound occurs even in the first stage of condensation. The same applies also to high molecular weight compounds containing primary or secondary hydrazine groups or imino groups, but by the process of the invention all these high molecular weight polymerization, polycondensation and polyaddition products can be converted into cross-linkable products containing N-alkoxymethyl groups by a single stage addition reaction by the simple action of alkoxymethyl isocyanates.

Compared with the above-mentioned condensation processes, the special feature of the process according to the invention may be seen to lie in the fact that not only can the alkoxymethyl group be introduced into high molecular weight systems containing amide groups but quite generally the N-alkoxymethyl group can be introduced into any high molecular weight compounds containing Zerewitinoff-active hydrogen atoms. It is thus possible, e.g. for the first time to convert high molecular weight compounds containing hydroxyl, mercapto, carboxyl or sulphonic acid groups by a single stage addition reaction into cross-linkable compounds containing N-alkoxymethyl groups.

Thus, by the process of the invention, every hydrogen atom reactive with isocyanates, i.e. every Zerewitinoff-active hydrogen atom, present in a high molecular weight polymerization, polycondensation or polyaddition product may be converted by an addition reaction into a group which is substituted by the N-alkoxymethyl radical. Thus, for example, free hydroxyl groups in high molecular weight compounds are converted into N-alkoxymethyl urethane groups by the action of alkoxymethyl isocyanates according to the following equation:

$$M(\text{—OH})_n + nR\text{—O—CH}_2\text{—NCO}$$
$$\rightarrow M(\text{—O—CO—NH—CH}_2\text{—OR})_n$$

(M=macromolecule; R=alkyl radical; n=whole number.)

Similarly, for example, primary or secondary amino or amido groups contained in high molecular weight compounds can be converted into N-alkoxymethyl urea groups, primary or secondary hydrazine or hydrazide groups into N-alkoxymethyl-semicarbazide groups, active methylene groups into N-alkoxymethyl carbonamide groups and carboxyl groups (with simultaneous splitting off of $CO_2$ into N-alkoxymethyl carbonamide groups.

The groups that are functional with respect to isocyanates may be end groups or chain members of the high molecular weight compounds or members of a side chain. Examples of formulae for such functional groups and their conversion into N-alkoxymethyl groups according to the invention are illustrated schematically by the following equations:

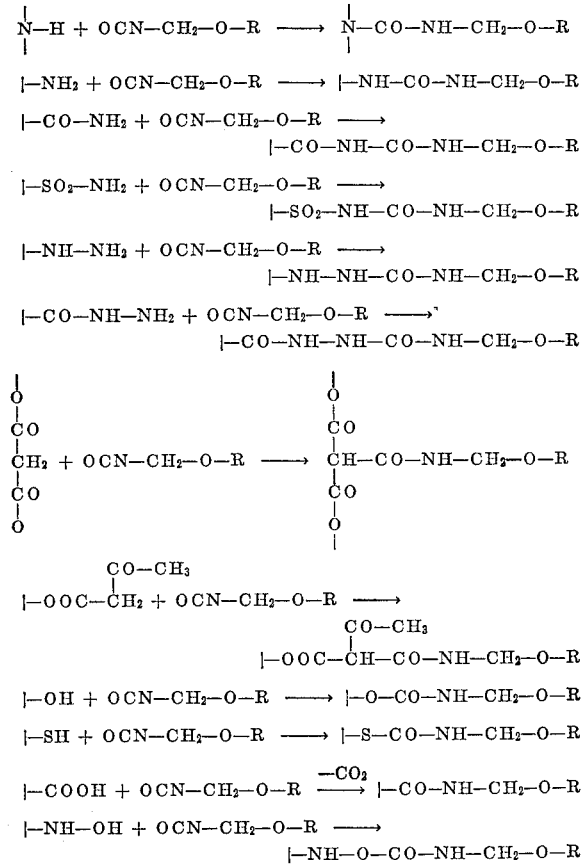

By the process according to the invention, all types of high molecular weight compounds which contain Zerewitinoff-active H-atoms, especially also high-functional and very sensitive polymerization, polycondensation and polyaddition products can be converted under mild conditions and in a clearly defined reaction into cross-linkable synthetic resins and preliminary products leading to synthetic resins, a particular advantage being that the reactions can be carried out completely free from salt, in inert media and in the absence of any kind of catalysts which might interfere with the reaction. The high molecular weight compounds containing N-alkoxymethyl groups obtained by the process are superior to the products of similar structure obtainable by known processes owing to the uniformity of their chemical constitution, their purity and their consequent extreme stability on storage.

Another advantage of the process according to the invention is that selective conversions can be carried out with high molecular weight compounds containing several types of Zerewitinoff-active hydrogen atoms, e.g. in the form of amido, hydroxyl and amino groups, in the same molecule, e.g. in that amino groups, owing to their higher reactivity compared with alkoxymethyl isocyanates, can be converted preferentially before the hydroxyl and amido groups.

Suitable starting materials for the process are any of the known types of high molecular weight polymerization, polycondensation and polyaddition products provided they contain one or more Zerewitinoff-active hydrogen atoms in the molecule. The following list is confined only to the most important types of such high molecular weight starting materials.

Any suitable polycondensation and polyaddition products such as polyesters, polyethers, polythioethers, polyacetals, polyamides, polyepoxy resins having hydroxyl groups in the molecule, phenolformaldehyde resins, aminoplasts and modification products thereof with polyfunctional alcohols, aniline formaldehyde resins, polyazomethines, polyurethanes, polyureas and polythioureas, polysulphonamides, melamine derivatives and cellulose derivatives may be used.

Any suitable polyesters may be used such as those prepared from polycarboxylic acids such as adipic acid, succinic acid, maleic acid, phthalic acid, isophthalic aid, terephthalic acid, tetrachlorophthalic acid, hexahydrophthalic acid, hexachloroendomethylene tetrahydrophthalic acid, trimellitic acid, pyromellitic acid and polyhydric alcohols such as ethylene glycol, butanediols, hexane diols, 2,2-dimethylpropane-1,3-diol, diethylene glycol, di-$\beta$-hydroxyethylene butanediol, tripropylene glycol, xylylene glycol, glycerol, trimethylol propane, pentaerythritol, mannitol and their hydroxyalkylation products; polyesters of hydroxypivalic acid, thioglycollic acid, $\omega$-hydroxydecanoic acid, caprolactone and diketene; polyesters of the above-mentioned dicarboxylic acids and polyphenols such as hydroquinone, 4,4'-dihydroxydiphenyl or bis-(4-hydroxyphenyl)-sulphone, polyesters modified with fatty acids ("oil alkyds") as well as naturally occurring saturated or unsaturated polyesters, their degradation products or ester interchange products with polyols such as castor oil, tall oil, soya oil, linseed oil, etc.; polyesters of carbonic acid which are obtainable in known manner from hydroquinone, diphenylol propane, p-xylylene glycol, ethylene glycol, butanediol or hexane diol-1,6- and other diols by the usual condensation reaction, e.g. with phosgene or diethyl or diphenyl carbonate, or from cyclic carbonates such as glycol carbonate or vinylidene carbonate by polymerization; polyesters of silicic acid, e.g. from dimethyl dichlorosilane and polyfunctional alcohols or phenols of the above-mentioned kind; polyesters of phosphonic acids, e.g. of methane, ethane, $\beta$-chloroethane, benzene or styrene phosphonic acid, phosphonic acid chloride or phosphonic acid esters and polyalcohols or polyphenols of the above-mentioned kind; polyesters of phosphorous acid obtained from phosphorous acid, phosphorous acid esters, ester amides or ester chlorides and polyalcohols, polyether alcohols and polyphenols; polyesters of phosphoric acid, e.g. from polyesters of phosphorous acid by oxidation or by ester interchange of phosphoric acid esters with alcohols or polyphenols; polyesters of boric acid; polysiloxanes, e.g. the products obtained by hydrolysis of dialkyldichlorosilanes with water followed by treatment with polyalcohols, or by addition of polysiloxane dihydrides to olefines, such as allyl alcohol or acrylic acid.

Any suitable polyethers may be used such as those prepared from alkylene oxides such as ethylene oxide, propylene oxide, 2,3-butylene oxide, epichlorohydrin and bis-(2,3-epoxypropyl ether) of diphenylol propane, from trimethylene oxide, 3,3-bis-(chloromethyl)-oxacyclobutane or tetrahydrofuran, from hexanediol, pentamethylene glycol, decamethylene glycol and from hydroxyalkylated phenols such as O,O-di-($\beta$-hydroxyethyl)-resorcinol; polyether-polythioethers, especially those obtained from thiodiglycol, basic polyethers, e.g. of di-($\beta$-hydroxypropyl)-methylamine, di-($\beta$-hydroxyethyl)-cyclohexylamine, di-($\beta$-hydroxyethyl)-aniline and di - ($\beta$ - hydroxyethyl)-m-toluidine.

Any suitable polythioethers may be used such as the so-called thioplasts, i.e. reaction products of aliphatic dihalogen compounds such as 1,2-dichloroethane, bis-(2-chloroethyl)-ether or bis-(2 - chloroethyl)-formal which contain mercaptan groups, as well as their oxyalkylation products.

Any suitable polyamines may be used such as, polyethylene imines, their cyanoethylation and hydroxyalkylation products, especially reaction products of polyalkylene polyamines with epichlorohydrin, and further, hydrogenation products of cyanoethylated high molecular weight polyamines and polyhydric alcohols as well as polyether alcohols or polyesters.

Any suitable polyacetals may be used such as those prepared from aldehydes such as formaldehyde and diols such as butanediol, hexanediol, polyoxymethylenes, e.g. copolymers of formaldehyde or trioxane with 1,3-dioxolane, 1,3-oxothiolane or ethylene oxide; naturally occurring polyacetals such as cane sugar, invert sugar, starch, dextrin, cellulose and their alkylation, acylation, ester interchange and degradation products; spirocyclic polyacetals of pentaerythritol and glyoxal.

Any suitable polymercaptals may be used such as those prepared from formaldehyde and 1,4-tetramethylene dimercaptan or 1,6-hexamethylene dimercaptan.

Any suitable polyamide may be used such as those prepared from diamines such as diamino-diphenylmethane and propane, m-xylylene diamine, ethylene diamine, tetramethylene diamine or hexamethylene diamine and polycarboxylic acids of the kind mentioned above (in connection with the polyesters), dimeric fatty acids and mineral acids of the phosphoric acid, phosphorous acid and phosphonic acids type; polypeptides obtained from natural or synthetic amino acids such as glycine, alanine, 4-aminobutyric acid, 6-aminocaproic acid or 17-amino-hepta-decanoic acid; polyamides of lactams, especially of 6-caprolactam; in addition, naturally occurring polypeptides and their degradation products, e.g. gelatine or casein; polyimides containing terminal amino groups, e.g. polydibenzaimidazoles and polyimides from pyromellitic acid anhydride and diamines and the known modification products of polyphosphoric nitrile chlorides with polyamines, aminoalcohols or polyalcohols; also, polyester amides obtained from the said polycarboxylic acids, polyhydric alcohols and polyamines or from polycarboxylic acids and amino alcohols, such as ethanolamine, 4-aminobutanol-1, 6-aminohexanol-1, diethanolamine or aminophenols.

Any suitable polyhydrazides may be used such as the condensation products of dicarboxylic acids and hydrazine; methylenepolyamides of dinitriles and formaldehyde, and polysulphonamides, e.g. of n-hexane-1,6-bis-sulphonic acid chloride or m-benzene-bis-sulphonic acid chloride and 1,6-hexamethylene diamine.

Any suitable polyazomethines may be used such as those prepared from terephthalic dialdehyde and ethylene diamine, hexamethylene diamine, tetrachloro-p-phenylene diamine, 4,4'-diaminodiphenyl ether or 4,4'-diamino-diphenylmethane.

Any suitable polyepoxy resins may be used such as high molecular weight resins which contain secondary hydroxyl groups and which are based on the bis-(2,3-epoxypropyl)-ether of 1,4-butanediol or diphenylol propane, those based on bis-(2,3-epoxypropyl)-aniline and those based on N,N'-bis-(2,3-epoxypropyl)-N,N'-dimethyl - 4,4' - diaminodiphenylmethane and modification products thereof with polyisocyanates, unsaturated carboxylic acids, natural resinic acids or with phenol, melamine and urea formaldehyde resins.

Any suitable phenolformaldehyde resins may be used such as those obtained by the usual methods, especially in the presence of excess formaldehyde, from phenol, cresols, xylenols, resorcinol or diphenylol alkanes by acid or alkaline condensation, and their cyanoethylation and hydrogenation products.

Any suitable aminoplast resins may be used such as those based on urea, thiourea, melamine, dicyandiamide, adipic acid diamide, hexamethylene diurea, ethylene urea, acetylene urea or m-benzene-disulphonamide and modification products thereof with polyols; aniline-formaldehyde resins and ketone resins, e.g. condensation products of cyclohexanone and formaldehyde melamine.

Any suitable polyureas may be used such as those obtained from hexamethylene diamine or bis-(γ-aminopropyl)-ether by condensation with carbon dioxide, urea or diphenyl-carbonate, those obtained from 1,10-decamethylene diamine by condensation with 1,6-hexamethylene-bis-ethylurethane or by polyaddition of diamines such as 4,4'-diaminodiphenylmethane, 4,4'-diamino-diphenyl, 1,8-octamethylene diamine or 2,6-diaminotoluene-4-sulphonic acid sodium salt to polyisocyanates such as 1,6-hexamethylene diisocyanate, 2,4-toluylene diisocyanate or 4,4'-diisocyanate-diphenylmethane.

Any suitable polythioureas may be used such as those obtained from hexamethylene diamine or p-xylylene diamine by condensation with carbon disulphide or trithiocarbonic acid esters or by polyaddition of diamines to diisothiocyanates, e.g. hexamethylene diisothiocyanate.

Any suitable polyurethane may be used such as those obtained from low molecular weight mono- or polyhydric alcohols such as ethylene glycol, propylene glycol, butanediol, hexanediol, diethylene glycol, triethylene glycol, thiodiglycol, N,N-di-(β-hydroxyethyl)-aniline or -m-toluidine, N-methyl-diethanolamine, hydroquinone-di-(β - hydroxyethyl)-ether, adipic acid di - (β - hydroxyethyl) - ester, N,N,N',N'-tetra-(2 - hydroxypropyl) - ethylene diamine, glycerol, trimethylol propane, mannitol or glucose, by polyaddition to polyisocyanates such as hexamethylene diisocyanate, tetramethylene diisocyanate, toluylene diisocyanate, p-phenylene diisocyanate, 4,4'-diisocyanate-diphenylmethane, 1,5-naphthylene diisocyanate, 4,4',4''-triphenylmethane triisocyanate or 4,4',4''-triisocyanate triphenyl thiophosphate; from high molecular weight polyhydroxyl compounds such as saturated or unsaturated polyesters, polyethers, polyacetals, polythioethers or polyester amides of the above-mentioned type which contain hydroxyl groups and if desired, also carboxyl groups, by polyaddition to polyisocyanates or masked polyisocyanate in the presence of the usual low molecular weight chain lengthening agents such as water, glycols, hydrazines, hydrazides, diamines and aminoalcohols, or from bis-chloroformic acid esters such as ethylene glycol bis-chloroformic acid esters or butane-1,4-diol bis-chloroformic acid esters, by condensation with di- or polyamines such as ethylene diamine, hexamethylene diamine, bis-(3-aminopropyl)-ether, piperazine, 1,4-diamino-cyclohexane, bis-(4-amino-3-methylphenyl)methane, p-phenylene diamine or diethylene triamine.

Suitable polymerization products for the process of the invention are any polymers which have a molecular weight above 600 and contain Zerewitinoff-active hydrogen atoms in the molecule. Suitable products are, for example, homo- or copolymers of the following compounds: β-hydroxyethyl acrylate, β-hydroxypropyl acrylate, β-hydroxypropyl-α-chloroacrylate, β-hydroxypropyl-α-phenyl acrylate, 2-hydroxy-3-phenoxypropyl - α - ethyl acrylate, 2-hydroxy-3-chloropropyl methacrylate, 4-hydroxyphenyl methacrylate, 6-hydroxyhexyl-methacrylate, 4-hydroxymethyl styrene, 2-aminoethyl methacrylate, methacrylic-2-hydroxyethyl acid amide, N-di-(β-hydroxyethyl)methacrylic acid amide, acrylic acid 4-hydroxyphenylamide, acrylic acid 4-hydroxybutylamide, vinyl-2-hydroxyethyl ether, 4-(2-hydroxyethyl)-styrene, allyl alcohol, methylacrylic acid trimethylolmethylamide, maleic acid di-2-hdroxyethyl ester, 2-hydroxyethyl maleate, methyl-2-hydroxyethyl maleate, acrylic acid 3-di-(β - hydroxyethyl) - aminopropylamide, methacrylamide, acrylamide, acrylic acid hydrazide, N-hydroxymethacrylamide, acrylic acid, methacrylic acid, vinyl sulphonic acid, vinyl sulphonamide.

It is preferred, however, to use as starting materials copolymers obtained from about 0.5 to about 25%, preferably from about 5 to about 10% of the above-mentioned monomers which are reactive with isocyanates and one or more of the following polymerizable compounds: methyl, ethyl or butyl acrylate, methyl, ethyl, butyl or allyl methacrylate, styrene, α-methyl styrene, chlorinated styrenes, vinyl acetate, vinyl butyrate, vinyl chloride, vinylidene chloride, vinylbutyl ether, vinyl pyridine, N-vinylpyrrolidone, N-vinyloxazolidone, N-vinyl ureas, N-vinyl urethanes, ethylene, propylene, butadiene, isoprene, dimethylbutadiene, chloroprene, glycol diacrylates.

Also to be mentioned are polymers in which groups reactive to isocyanates are produced by a subsequent treatment, e.g. by a graft reaction or by a hydrolysis process. Such polymers include e.g. polyvinyl alcohol, partially saponified polyvinyl acetate, partly saponified polyvinylacetate-polyethylene copolymer, partly saponified polyacrylate, partly saponified polyvinylidene carbonates, hydrogenation products of copolymers of ethylene with carbon monoxide, graft copolymers of vinyl compounds such as vinyl chloride, vinyl acetate or acrylonitrile, on linear or branched polyethers or polyacetals or on polymers of the above-mentioned kind which have functional groups that are reactive to isocyanates.

The high molecular weight starting materials for the process according to the invention may be linear or branched and have a molecular weight of from about 600 to about 500,000, preferably about 600 to about 100,000.

Suitable for the reaction with the high molecular weight starting materials are any N-alkoxymethyl isocyanates. The alkoxy group normally has 1 to 12 carbon atoms, it can be saturated or unsaturated and it can be substituted by halogen atoms like fluorine, chlorine, bromine or iodine. Typical examples are methoxymethyl isocyanate, ethoxymethyl isocyanate, isobutoxymethyl isocyanate, β-chloroethyoxymethyl isocyanate, β-bromoethoxymethyl isocyanate, allyloxymethyl isocyanate and dodecyloxymethyl isocyanate.

N-alkoxymethyl isocyanates may be prepared as follows according to German Auslegeschrift, 1,205,087.

α-Halogenalkyl ethers are reacted with alkali metal or alkaline earth cyanates at temperatures of from about 0 to about 200° C. in solvent mixtures of from about 0.01 to about 80 vol. percent of a strongly polar solvent and 99.99 to 20 vol. percent of an aliphatic, cycloaliphatic, araliphatic or aromatic hydrocarbon. This process is described below, using methoxymethyl isocyanate by way of example:

About 700 parts by weight of sodium cyanate are suspended in a mixture of about 500 parts by vol. of benzonitrile and about 1,000 parts by vol. of mesitylene, and about 648 parts by weight of chloromethyl-methylether are added. The mixture is boiled under reflux and at the same time, stirred until all the chlorine of the chloromethyl methyl ether has undergone reaction (about 12 hours). The resulting methoxymethyl isocyanate is distilled off directly from the reaction mixture and after fractional distillation over a column, about 585 parts by weight of methoxymethyl isocyanate are obtained. The yield is 84% of the theoretical yield.

Owing to the large variety of possible starting materials and their physical and chemical properties, the reaction conditions under which the reaction according to the invention of the high molecular weight starting materials with the alkoxymethyl isocyanates is carried out may be varied within certain limits. The reaction may be carried out at from about −50 to about +250° C., preferably at from about 20 to about 150° C. in bulk, in solution, suspension or emulsion. Suitable solvents or diluents generally are compounds which are inert to isocyanates, such as hydrocarbons, chlorinated hydrocarbons, ethers, esters, ketones, dialkyl carbonamides, sulphones, sulphoxides and nitriles. If the compound to be reacted with the alkoxymethyl isocyanate contains basic primary or secondary amino- or hydrazine groups as Zerewitinoff-active groups, then the reaction may also be carried out in solvents or diluents which contain hydroxyl groups, e.g. alcohols or water, because in that case the isocyanate reacts selectively with the reactive amino groups.

The isocyanate may be provided either in solution or in bulk, and the high molecular weight compound may be added in bulk, solution, emulsion or suspension, or conversely. The alkoxymethyl isocyanate may be employed in stoichiometric quantity based on the quantity of Zerewitinoff-active hydrogen atoms present in the high molecular weight compound, or in a greater or smaller amount, depending on the type of end product desired. After the reaction has been completed, the excess isocyanate can easily be removed by heating the products or solutions of the products, preferably at reduced pressure.

According to a special method of carrying out the process of the invention, the high molecular weight compounds are reacted with an excess of alkoxymethyl isocyanate based on the amount of active hydrogen atoms present, and the excess alkoxymethyl isocyanate in the reaction mixtures is then converted into low molecular weight polyalkoxymethyl urethanes or ureas by the addition of polyamines or polyhydric alcohols. The polyalkoxymethyl urethanes or ureas remain in the reaction product and make it possible to vary the degree of cross-linking in a subsequent cross-linking process.

The reaction in most cases proceeds satisfactorily even in the absence of catalysts. However, the usual activators for isocyanate reactions, e.g. tertiary amines, tin compounds and other metal salts, may be added if desired.

The products of the process constitute valuable cross-linkable synthetic resins or intermediate products for the production of synthetic resins. They can be formed by the known methods and then cross-linked by a suitable method, e.g. by heating and/or by the action of acid catalysts. The products are also suitable for use as auxiliary agents for textiles and leather and as starting materials for surface active compounds.

The process of the invention will be explained more fully below with the aid of the following examples where parts are by weight unless otherwise specified.

EXAMPLE 1

About 200 parts of an anhydrous, linear, crystallized polybutylene glycol of OH number 44 are melted at about 80° C. and reacted with about 18 parts of methoxymethyl isocyanate, about 0.2 part of the divalent tin salt of 2-ethylcaproic acid being used as catalyst. After heating the reaction components at about 80° C. for about three hours, a bifunctional methoxymethyl diurethane of polybutylene glycol which is crystalline at room temperature is obtained; this product can be stored indefinitely. If the addition product is heated at about 140° C. in the presence of about 0.2% p-toluene-sulphonic acid in a water jet vacuum, methanol splits off progressively and a small amount of methylal also splits off and an insoluble, rubber-like cross-linked product is obtained.

EXAMPLE 2

The procedure is as in Example 1, but (a) about 200 parts of a linear polythioether of OH number 53, prepared by acid condensation of thiodiglycol with about 30 parts triethylene glycol, (b) about 200 parts of a linear propylene glycol polyether of OH number 60, (c) about 200 parts of a linear polyester amide of ethanolamine and adipic acid of OH number 118 and (d) about 200 parts of a branched polyester of OH number 140, obtained from adipic acid, ethylene glycol in which 8% trimethylol propane are incorporated are used and the reaction is carried out in the melt under the conditions given in Example 1, using (a) about 20 parts, (b) about 25 parts, (c) about 40 parts and (d) about 55 parts of methoxymethyl isocyanate. When the reaction is completed, excess methoxymethylisocyanate is removed in a water jet vacuum. While the polyaddition products (a), (b) and (c) are converted into rubber-like cross-linked products only in the presence of about 0.2% of p-toluene-sulphonic acid at about 140° C., preferably with continuous removal of methanol in vacuo, the branched poly-addition product (d) undergoes cross-linking even in the absence of acids when heated to from about 150 to about 160° C.

EXAMPLE 3

About 200 parts of a branched polyester-acetal of diglycol terephthalate and formaldehyde containing about 4% trimethylol propane incorporated in the molecule and having OH number 150 is reacted in the melt at about 90° C. with about 60 parts of methoxymethyl isocyanate in the presence of about 0.5 part of dimethylbenzylamine as catalyst. After about 3 hours' heating at about 90° C., any unreacted methoxymethyl isocyanate is converted into di-N-methoxymethyl-butanediol-diurethane by the addition of 1,4-butanediol. If about 0.5% of toluene sulphonic acid is then added to the reaction product and the product heated to about 140° C. in a water jet vacuum, a non-melting, horny, cross-linked product is obtained.

EXAMPLE 4

About 50 parts of the triglyceride of ricinoleic acid are reacted with about 15 parts of methoxymethyl isocyanate at about 90° C. in the presence of about 0.2 part of the divalent tin salt of 2-ethylcaproic acid. After heating the reaction components for about 4 hours, the unreacted methoxymethyl isocyanate is bound in the form of bis-(methoxymethyl)-urea derivative by the addition of about 4 parts of $\omega,\omega'$-diamino-dibutyl ether. About 0.2% of p-toluene sulphonic acid is added and the polyaddition product is heated to about 140° C. in a water jet vacuum. After about 2 hours, a highly cross-linked, gelatin-like reaction product is obtained.

EXAMPLE 5

About 10 parts of a highly viscous hydroxyethylated phenol-formaldehyde resin of OH number 336, prepared by basic catalytic condensation of 1 mol. of phenol with 1.3 mol. of formaldehyde is reacted with an excess of methoxymethyl isocyanate at about 90° C. after first hydroxyalkylating with ethylene oxide. The sodium salts (0.3%) present in the hydroxyethylated phenol resin serve as catalyst. After about 2 hours' heating, excess methoxymethyl isocyanate is removed in vacuo, about 0.5% of p-toluene-sulphonic acid is added and the mixture heated in vacuo at about 140° C. An opaque, hard, cross-linked condensation product is obtained.

EXAMPLE 6

About 50 parts of a high molecular weight epoxy resin based on 2,2-bis(p-hydroxy-phenyl)-propane and epichlorohydrin of average molecular weight 3500, having secondary hydroxyl groups and terminal epoxy groups and an OH content of 3.2% are dissolved in about 200 parts of chlorobenzene at about 100° C. and reacted with about 25 parts of methoxymethyl isocyanate in the course of about 6 hours in the presence of about 0.2 part of the divalent tin salt of 2-ethylcaproic acid. Excess solvent and methoxymethyl isocyanate are then removed in vacuo and a highly cross-linked, non-melting synthetic resin is obtained after a short time at about 130° C., even in the absence of acid as catalyst.

EXAMPLE 7

About 20 parts of a highly cross-linked N-methylol-polyether (4% OH), prepared according to DAS 1,049,094 from urea, formaldehyde, hexanetriol and bis-hydroxyalkylated 1,4-butanediol are reacted with excess methoxymethyl isocyanate in the course of 3 hours at 90° C. in 30 parts by weight of dioxane in the presence of 0.2 part by weight of sodium formate as catalyst. A clear dioxane solution is obtained which is stable for an unlimited length of time. On removal of the solvent in vacuo, a gelatinous, cross-linked reaction product is obtained.

EXAMPLE 8

(a) Preparation of starting product

About 200 parts of a polyester of adipic acid and ethylene glycol (OH number 56) are dewatered in a vacuum of about 15 mm. at about 130° C. for about 0.5 hour. When the temperature has dropped to about 95° C., about 28 parts of diphenylmethane diisocyanate are stirred into the melt. The temperature is kept at about 95° C. for about 8 minutes, about 2.9 parts of finely powdered 4,4'-diaminodiphenylmethane are added, and the viscous melt is poured onto a support which is then heated for about 10 hours at about 90° C. A polyurethane containing terminal amino group is obtained which is stable when stored and can be rolled into a smooth sheet on rubber mixing rollers and softens at about 120° C.

(b) Reaction with methoxymethylisocyanate

Portions each amounting to about 5 parts of storable polyurethane which contains amino end groups are reacted (a) in the melt, (b) in concentrated dimethylformamide solution and (c) heterogeneously in o-dichlorobenzene in the swelled state with about 0.5 part of methoxymethylisocyanate for about 30 minutes. The samples are then extracted with acetone and the dimethylformamide sample is precipitated by the addition of water. The purified samples are then heated for about 5 hours at about 100° C. and thereby converted into branched or cross-linked polyurethanes the softening or decomposition point of which has risen to from about 160 to about 190° C.

EXAMPLE 9

About 6 parts of methoxymethylisocyanate are introduced dropwise at about 140° C. into about 20 parts of a short-chained linear terephthalic acid glycol polyester which contains exclusively hydroxyethyl end groups and has an OH number of 40, the mixture being stirred and cooled efficiently by reflux cooling during this procedure.

After about half an hour, the temperature is lowered to about 120° C., and excess methoxymethylisocyanate and methanol formed during the condensation are driven off in a water jet vacuum. After about 6 hours condensation, a hard, cross-linked and non-melting synthetic resin is obtained.

EXAMPLE 10

About 20 parts each of a finely powdered polyoxymethylene of average molecular weight 4000 and a polyoxymethylene of average molecular weight approximately 30,000, both of which contain alcoholic hydroxyl end groups and have been prepared by polymerization of trioxane with 1,3-dioxolane with the use of boron trifluoride as catalyst and degraded down to the terminal comonomer units by basic catalytic deploymerization, are heated in about 100 parts of anhydrous dioxane with a large excess of methoxymethyl isocyanate (about 15 parts) for about 30 hours at about 100° C. in the presence of about 0.5 part of dimethylbenzylamine. The addition products are then filtered hot, boiled several times with acetone, dried, dissolved in glycol carbonate at about 130° C. and reprecipitated. The low molecular weight polyoxymethylene has a nitrogen content of about 0.5% corresponding to about 70% conversion of the hydroxyl end groups. The partial modification of the high molecular weight polyoxymethylene manifests itself in increased thermostability of the end product which loses 1% of formaldehyde less per hour than the starting product when subjected to heat treatment at about 220° C.

EXAMPLE 11

About 30 parts of a partially saponified copolymer of ethylene and vinyl acetate (approximately 70:30) containing about 3.3% of secondary hydroxyl groups are dissolved in about 100 parts of anhydrous ethyl acetate under reflux and boiled under reflux for about 6 hours with about 18 parts of methoxymethylisocyanate in the presence of about 0.8 part of dimethylbenzylamine as catalyst. The high molecular weight polyaddition product is obtained in the form of a highly stable solution which is clear even at room temperature. If this is poured onto supports after first adding catalytic quantities of p-toluene sulphonic acid, then films are obtained which undergo cross-linking when subsequently heated to about 100° C. and which are insoluble in ethyl acetate.

EXAMPLE 12

The procedure is exactly the same as in Example 11, but a high molecular weight copolymer which contains about 11.2% of secondary hydroxyl groups is used and the reaction is carried out with about 30 parts of polymer, about 100 parts of dioxane and about 56 parts of methoxymethylisocyanate. Whereas the starting product is only sparingly soluble in inert polar solvent, the polyurethane molecule produced by the polyaddition reaction has excellent solubility in the widest variety of organic solvents due to its N-methylol methylether groups and it has excellent stability in storage. If the solutions are spread onto glass plates after having been treated with catalytic quantities of acid catalysts or agents which split off acid, then highly cross-linked, insoluble films are obtained on drying.

EXAMPLE 13

About 10 parts of a copolymer of 90% of acrylonitrile and 10% of methacrylic acid amide (K-value: 88.6) are dissolved in about 90 parts of dimethylformamide. About 0.6 part of methoxymethyl isocyanate is added to this solution at about 40° C. and the solution is then heated at from about 50 to about 60° C. for about one hour. A sample of the solution obtained is painted on a glass plate. This is then dried in a drying cupboard at about 50° C. for about 8 hours. The film is then stripped from the plate. A sample strip of the film dissolves easily and completely in dimethylformamide. To test for cross-linkability, the film is then boiled for about 30 minutes in a 0.05% aqueous solution of p-toluene sulphonic acid, taken out and dried in a drying cupboard at about 100° C. for about one hour. The film is now cross-linked and insoluble in dimethylformamide even at boiling temperature.

EXAMPLE 14

About 10 parts of a homopolymer of β-hydroxypropyl methacrylate are dissolved in about 90 parts glycol acetate. About 6.0 parts of methoxymethyl isocyanate are added to this solution at about 40° C. and the solution is heated at about 60° C. for about 30 minutes. When dried at room temperature or even at elevated temperature, the solution gives rise to glass clear films which are easily soluble in organic solvents. If the polymer solution is treated with catalytic quantities of a strong acid, e.g. p-toluene sulphonic acid, phosphoric acid or sulphuric acid, a cross-linked insoluble polymer is obtained.

EXAMPLE 15

About 0.1 part of divalent tin dioctoate and about 2.9 parts of methoxymethyl isocyanate are added at about 50° C. to about 100 parts of a 48% solution in benzene of a copolymer of 90% styrene and 10% β-hydroxypropyl methacrylate. The mixture is left to react for about one hour from at about 50 to about 60° C., a sample of the solution is spread on a glass plate and dried for about 8 hours at about 50° C. The resulting clear, colorless film is readily soluble in organic solvents. Treating it with dilute p-toluene sulphonic acid by the method indicated in Example 13 gives rise to a cross-linked film which is insoluble in all organic solvents.

EXAMPLE 16

About 1.3 parts of methoxymethyl isocyanate are added at about 60° C. to about 100 parts of a 20% solution of a copolymer of 90% ethyl acrylate and 10% β-hydroxyethyl acrylate. After one hour heating at about 70° C., the isocyanate has undergone reaction. When spread onto a surface and dried, the polymer solution forms clear, colorless films which are easily soluble in organic solvents. The polymer can be cross-linked by the addition of catalytic quantities of strong acids.

EXAMPLE 17

About 0.2 part of triethylene diamine and about 0.3 part of methoxymethyl isocyanate are added at about 50° C. to about 100 parts of a 10% solution of a copolymer of 95% acrylonitrile and 5% β-hydroxypropyl methacrylate in dimethyl formamide, and the mixture is left to react for about one hour at about 80° C., and colorless films are produced by painting the polymer solution onto glass plates. These films are dried and are then easily soluble in dimethyl formamide. By boiling for a short time in a 0.05% aqueous solution of p-toluene sulphonic acid according to Example 13, cross-linked films are obtained which are insoluble in dimethylformamide.

The same result is obtained if instead of using about 0.3 part methoxymethyl isocyanate from about 0.3 to about 0.4 part of ethoxymethyl isocyanate is left to react on the solution of the copolymer, the procedure being otherwise the same as indicated above.

EXAMPLE 18

By a method similar to that described in Example 17, about 100 parts of a 10% solution of a copolymer of 96% acrylonitrile and 4% β-hydroxypropyl methacrylate is reacted with about 0.4 part isobutoxymethyl isocyanate in the presence of about 0.2 part of triethylene diamine. A colorless, clear solution is obtained. By the method described in Example 13, films are prepared from the solution; after drying, these films can easily be dissolved again in dimethylformamide. If, on the other hand, the films are boiled for about 30 minutes in about 0.05% aqueous sulphuric acid, then they can no longer be dissolved even in boiling dimethylformamide once they have been dried.

EXAMPLE 19

About 10 parts of a copolymer of 96% acrylonitrile and 4% methacrylic acid tris-methylolmethylamide (K-value 86) are dissolved in about 90 parts of dimethylformamide. About 0.67 part of ethoxymethyl isocyanate is added to this solution at about 50° C., the mixture is left to react for about one hour at about 80° C. and samples of the polymer solution are then spread onto glass plates. After drying, clear, colorless films are obtained which are easily soluble in dimethylformamide, but after a treatment with dilute p-toluene sulphonic acid (see Example 13) they are cross-linked and insoluble in all organic solvents.

EXAMPLE 20

About 0.1 part of divalent tin octoate and about 0.3 part of methoxymethyl isocyanate are added at about 60° C. to about 50 parts of a 20% solution of a copolymer of 95% vinyl chloride and 5% β-hydroxyethyl methacrylate in tetrahydrofuran. After the addition of catalytic quantities of strong acids such as p-toluene sulphonic acid or sulphuric acid, the resulting clear polymer solution gelatinizes, especially if it is subsequently heated in the presence of the acid.

EXAMPLE 21

About 30 parts of a basic polyether of molecular weight 2600 and OH number 43, prepared according to German Patent 1,243,874 by polycondensation of N,N-di-(β- hydroxyethyl)-aniline are dissolved in about 70 parts by volume benzene. To this solution are added 2.0 parts methoxymethyl isocyanate at about 40° C. The solution is heated for about 2 hours at about 80° C., and about 0.5 part of p-toluene sulphonic acid are then added. Pale yellow, clear films are prepared from this solution; these films, after having been dried at room temperature for about 24 hours, are insoluble in benzene and other organic solvents.

EXAMPLE 22

A solution of about 20 parts of Celite (secondary acetyl cellulose containing 54% bound acetic acid) in a mixture of about 80 parts of acetone, about 40 parts of toluene and about 60 parts of glycol monomethyl ether acetate is treated with a solution of about 1.2 parts of methoxymethyl isocyanate in about 9 parts by volume of acetone at room temperature and left to stand for about 1½ hours. At at the end of that time, the odor of isocyanate is no longer detectable. Two thin coatings, each from about one part of the solution, are prepared on glass plates. One film is dried for about half an hour at about 100° C. It is then still soluble in boiling pyridine but only partially soluble in boiling acetone. The second film is dried for about half an hour at about 150° C. and is then insoluble in boiling acetone or pyridine. Another coating was prepared from Celite solution not treated with methoxymethyl isocyanate to serve as a control, and dried for about 0.5 hour at about 150° C. The result was a film which was completely soluble in boiling acetone or pyridine.

EXAMPLE 23

A Celite solution (Celite content about 20 parts) treated with methoxymethyl isocyanate according to Example 22 is treated with a solution of about 0.1 part of p-toluene sulphonic acid in about 5 parts by volume of acetone. About one part of this solution is then spread onto glass and dried for about 0.5 hour at about 100° C. The resulting film is insoluble in boiling acetone or pyridine.

EXAMPLE 24

210 g. of a polyester prepared from 1.5 mols of adipic acid, 1.5 mols of phthalic acid and 4 mols of trimethylolpropane, containing 10.6% OH, having the acid number 0.7, are dissolved in 265 g. of ethyleneglycolmonomethylether acetate. 55 g. of methoxymethylisocyanate are added dropwise at 50° C. and the solution is then stirred at 70° C. for another 2 hours.

After the addition of 0.1% of p-toluene sulfonic acid coatings are prepared from the solution on glass plates and metal surfaces. After drying at 120° C. for 1 hour elastic films which are insoluble in solvents such as acetone or dimethylformamide are obtained.

EXAMPLE 25

A polyester having the hydroxyl number 293 and the acid number 1.0 which was prepared from 3 mols of trimethylolpropane, 1 mol of hexanediol, 2 mols of phthalic acid and 1 mol of adipic acid, is dissolved in ethyleneglycolmonomethylether acetate. 74 g. of methoxymethylisocyanate are added dropwise to 360 g. of the 50% solution. Upon heating at 70° C. the reaction is complete after 5 hours. A solution of a self-cross-linking polyester is thus obtained, which is stable on storage as such. Upon the addition of 0.5% of p-toluene sulfonic acid the modified polyester undergoes cross-linking at room temperature within 3 days, together with 1% of phosphorus oxychloride at 20° C. within 2 hours.

EXAMPLE 26

A clear solution is prepared from 180 g. of a polyester (prepared from 2 mols of phthalic acid, 1 mol of adipic acid, 3 mols of trimethylolpropane and 1 mol of hexanediol) containing 8.9% OH and having the acid number 1.0, together with 86 g. of ethyleneglycolmonomethyl- ether acetate. 74 g. of methoxymethylisocyanate are added dropwise to the solution at 50° C. The reaction is complete by stirring at 70° C. for another 4 hours.

Metal surfaces and glass plates are coated with the solution (75%) thus obtained. Elastic cross-linked coatings are obtained at 180° C. after 1 hour. When cross-linking is effected with the addition of 1% p-toluene sulfonic acid, glass-hard, brittle films are obtained.

EXAMPLE 27

400 g. of a polyester amide having the hydroxyl number 409 and the acid number 0.8, which was prepared from 3 mols of adipic acid, 3 mols of phthalic acid, 8 mols of trimethylolpropane and 1 mol of ethanolamine are dissolved in 209 g. of ethyleneglycolmonoethylether acetate. 228 g. of methoxymethylisocyanate are added dropwise to the solution at 50° C. within 2 hours. The reaction is complete after another 6 hours at 50° C. A solution of a polyester amide which can be cross-linked by addition of a catalytical amount of acid is thus obtained.

Coatings on wood, glass and metal surfaces which were dried with 1% phosphoric acid at 70° C. for 1 hour, are insoluble in ethyleneglycolmonomethylether acetate.

EXAMPLE 28

265 g. of methoxymethylisocyanate are added dropwise at 70° C. within 2 hours to 500 g. of a polyether of the hydroxyl number 400 and the average molecular weight 450 (prepared from trimethylolpropane and propylene oxide). The temperature is kept at 80° C. for another 4 hours to complete the reaction. The polyether thus modified undergoes cross-linking at 120° C.–150° C. within 1 hour after the addition of 0.1–1% of phosphorous acid or phosphoric acid.

EXAMPLE 29

30 g. of a polyester of the hydroxyl number 385 and the acid number 54, which was prepared from 3 mols of adipic acid, 3 mols of phthalic acid and 8 mols of trimethylolpropane, are dissolved in 45 cc. of ethyleneglycolmonomethylether acetate. After the addition of one drop of tin dioctoate, 16.1 g. of methoxymethylisocyanate are added dropwise to the solution which is kept at a temperature of 40° C. for 6 hours to complete the reaction. A solution of a self-cross-linking polyester which is stable on storage at 20–50° C. and which can be cross-linked at 120–150° C. within 60–90 minutes without the addition of a catalyst is thus obtained.

EXAMPLE 30

(a) Preparation of the starting material 100 g. of a polyester of the hydroxyl number 290 and the acid number 1.6, which was prepared from 3 mols of phthalic acid, 3 mols of trimethylolpropane and 1 mol of hexanediol, are dissolved in 110 g. of ethyleneglycolmonomethylether acetate. 10 g. of hexamethylenediisocyanate are then added dropwise at 80° C. and the reaction is complete by heating to 100° C. for 4 hours. A 50% solution of a polyurethane of the hydroxyl number 108 is thus obtained (b) Process according to the invention Upon the addition of 2 drops of tin dioctoate, 69 g. of methoxymethylisocyanate are added dropwise to 495 g. of a solution prepared according to Example 30a and the solution is stirred at 70° C. for another 4 hours. The solution thus obtained can be cross-linked by drying at 120° C. for 1 hour after the addition of 0.025% of p-toluene sulfonic acid and 0.25% of phosphoric acid. Films prepared on glass plates and metal surfaces show an excellent resistance to solvents and hardness.

EXAMPLE 31

748 g. of ethylene glycol monoethyl ether acetate are added to 1400 g. of a polyester of the hydroxyl number 410 and the acid number 12, which was prepared from trimethylolpropane, glycol and phthalic acid, and the temperature is raised until a clear solution has formed. 20 mg. of tin dioctoate are then added and 843 g. of methoxymethylisocyanate are added dropwise at 50 to 70° C. within 2 hours. Stirring is continued at 70° C. for another 4 hours to complete the reaction. A solution of a self-cross-linking polyester is obtained. By the addition of 0.01 to 5% of a catalyst (phosphoric acid, phosphorous acid, phosphorus oxychloride, maleic acid or p-toluene sulfonic acid) hard or soft films of high stability to solvents can be prepared on metal, glass and wood at room temperature or elevated temperature.

EXAMPLE 32

30 mg. of tin dioctoate are added as catalyst to 320 g. of a polyether of the hydroxyl number 398, which was prepared by reacting trimethylol propane and ethylene oxide, and 195 g. of methoxymethylisocyanate are subsequently added dropwise at 70° C. The reaction is complete after 1 hour's heating at 80 to 100° C.

By dissolving the self-cross-linking polyether thus obtained in water or in an organic solvent and adding phosphoric acid, coatings can be prepared on glass or metal, which yield at 130° C. elastic films which are insoluble in acetone.

EXAMPLE 33

250 g. of a polyether of the hydroxyl number 380, which was prepared from glycerol and ethylene oxide, are heated to 80° C. and then reacted with 145° g. of methoxymethylisocyanate for 3 hours.

A self-cross-linking polyester is obtained in form of a viscous clear liquid which can be converted into the cross-linked state by means of hydrochloric acid or phosphoric acid.

EXAMPLE 34

Solutions of 200 g. each of Celite (secondary acetyl cellulose having a content of 1.8% OH) in 500 g. of acetone are tested with a solution of (a) 16 g. of methoxymethylisocyanate in 50 g. of acetone
(b) 18 g. of ethoxymethylisocyanate in 50 g. of acetone
(c) 21 g. of n-propoxymethylisocyanate in 50 g. of acetone
(d) 21 g. of iso-propoxymethylisocyanate in 50 g. of acetone
(e) 23 g. of n-butoxymethylisocyanate in 50 g. of acetone
(f) 23 g. of iso-butoxymethylisocyanate in 50 g. of acetone
(g) 25 g. of n-pentyloxymethylisocyanate in 50 g. of acetone Two coatings each are prepared on glass plates from 1 g. each of the water clear solutions (a) to (g); one of the coatings is dried at room temperature overnight and the other at 150° C. for half an hour. The clear films (a) to (g) thus obtained are insoluble and do not swell in boiling acetone after having been dried at 150° C., whereas the foils (a) to (g) which were dried at room temperature are still completely soluble in acetone. The latter are rendered in soluble in acetone after heating them for example at 150° C. for half an hour. To serve as a control a coating was prepared from a Celite solution which had not been treated with alkoxymethylisocyanate, and dried at 150° C. for half an hour. The resulting film is completely soluble in acetone.

EXAMPLE 35

100 g. each of the Celite solutions prepared according to Example 34 (a) to (g) are treated with a solution of 100 mg. of 5-sulfo-salicylic acid in 10 g. of acetone. Coatings on glass plates are then prepared from 1 g. each of these solutions and dried at 200° C. for half an hour. The clear films (a) to (g) thus obtained are insoluble in boiling acetone.

EXAMPLE 36

500 g. each of a 10% aqueous solution of commercial gelatin are treated while stirring with a solution of (a) 1.5 g. of methoxymethylisocyanate in 20 ml. of acetone
(b) 2.0 g. of ethoxymethylisocyanate in 20 ml. of acetone
(c) 2.5 g. of n-propoxymethylisocyanate in 30 ml. of acetone
(d) 2.5 g. of iso-propoxymethylisocyanate in 20 ml. of acetone
(e) 3.0 g. of n-butoxymethylisocyanate in 20 ml. of acetone
(f) 3.0 g. of iso-butoxymethylisocyanate in 20 ml. of acetone Coatings are prepared on safety glass plates from 10 g. each of the resulting solutions (a) to (f) and dried at 50° C. and 40% atmospheric moisture for 8 hours. The resulting flexible foils (a) to (f) are insoluble in boiling water. To serve as a control a coating is prepared from a gelatin solution, which was not treated with alkoxymethylisocyanates, and likewise dried at 50° C. and 40% atmospheric moisture for 24 hours. The gelatin foil thus obtained is completely soluble in warm water.

EXAMPLE 37

500 g. each of a solution of 50 g. of casein powder in a mixture of 50 g. of triethanol amine and 400 g. of water are treated while stirring with a solution of (a) 1.5 g. of methoxymethylisocyanate in 20 ml. of acetone
(b) 2.0 g. of ethoxymethylisocyanate in 20 ml. of acetone
(c) 2.5 g. of n-propoxymethylisocyanate in 20 ml. of acetone
(d) 2.5 g. of iso-propoxymethylisocyanate in 20 ml. of acetone
(e) 3.0 g. of n-butoxymethylisocyanate in 20 ml. of acetone
(f) 3.0 g. of iso-butoxymethylisocyanate in 20 ml. of acetone
(g) 3.0 g. of n-pentyloxymethylisocyanate in 20 ml. of acetone Coatings are prepared on glass plates from 10 g. each of the resulting solutions (a) to (g) and dried at 75° C. and 40% atmospheric moisture for 4 hours each. The resulting brittle foils (a) to (g) are insoluble in a boiling mixture of triethanol amine and water (ratio 1:8).

To serve as a control a coating is prepared from a similar casein solution, which was not treated with alkoxymethylisocyanates, and dried at 50° C. and 40% atmospheric moisture for 24 hours. The casein foil obtained is completely soluble upon heating in a mixture of triethanol amine and water (ratio 1:8).

Other coatings are prepared on glass plates from 10 g. each of the above solutions (a) to (g) and dried at room temperature for 24 hours. The resulting casein foils (a) to (g) are completely soluble in a boiling mixture of triethanol amine and water (ratio 1:8); they become insoluble however upon heating them at 100° C. for 15 minutes.

EXAMPLE 38

425 g. each of a 10% aqueous solution of a basic polyamide (prepared by condensation from 206 g. of diethylene triamine and 292 g. of adipic acid) are treated while stirring with (a) 17.4 g. of methoxymethylisocyanate
(b) 20.2 g. of ethoxymethylisocyanate
(c) 23.0 g. of n-propoxymethylisocyanate
(d) 23.0 g. of iso-propoxymethylisocyanate
(e) 25.8 g. of n-butoxymethylisocyanate
(f) 25.8 g. of iso-butoxymethylisocyanate Coatings are prepared on glass plates from 10 g. each of the resulting thinly liquid solutions (a) to (f) wherein 50 mg. of ammonium nitrate are dissolved, and dried at 80° C. for 2 hours. Foils prepared therefrom are insoluble in boiling water. For purposes of control a coating is prepared from 10 g. of the polyamide solution, which was not treated with alkoxymethylisocyanate, and likewise dried at 80° C. for 2 hours. The resulting tacky substance completely dissolves in hot water.

EXAMPLE 39

200 parts by weight of a copolyester of hexane-diol-(1,6) and dimethylpropane-diol-(1,3) at a molar ratio of about 2:1 and adipic acid (OH number 65) are dehydrated by heating in vacuum at 130° C. for 30 minutes. 43 parts by weight of diphenylmethane diisocyanate-(4,4') are added with stirring at 90° C. within about 10 minutes and then 2 parts by weight of 1,1,1-tri-(hydroxymethyl)-propane and 4 parts by weight of butane-diol-(1,4) within about 5 minutes. 3 parts by weight of methoxymethylisocyanate are then added, the homogeneous reaction mixture is stirred for a further about 5 minutes and poured into a container treated with a mold release agent. After heating at 100° C. for 10 hours a viscous, not cross-linked reaction product is obtained which can be mixed on a rubber roller with fillers, for example carbon black or silica as well as catalyst, such as p-toluene sulfonic acid. Mixtures of this type can be converted into cross-linked products by the usual methods of rubber processing, for example by pressing in the heat with simultaneous moulding or as calendered sheets by curing. Besides, the reaction product which is capable of being rolled can be dissolved in a suitable solvent for example ethyl acetate, methylene chloride, chlorobenzene and dimethylformamide, and made into films and coating, optionally upon the addition of a catalyst, for example p-toluene sulfonic acid, which can be cross-linked by heating.

EXAMPLE 40

200 parts by weight of the copolyester described in Example 1 are dehydrated and then dissolved in 750 parts by weight of ethyl acetate. 23 parts by weight of the mixture of 65 parts by weight of toluylene diisocyanate-(2,4) and 35 parts by weight of toluylene diisocyanate-(2,6) and subsequently 2 parts by weight of 1,1,1-tri-(hydroxymethyl)-propane in 25 parts by weight of ethyl acetate are added dropwise to the solution. The reaction mixture is refluxed for 5 hours. 3 parts by weight of methoxymethylisocyanate are then added and the mixture is stirred until the reaction is complete. A solution is obtained which can be used by the usual processes for the production of films and coatings which can be cross-linked.

EXAMPLE 41

A product which is capable of being rolled is obtained by reacting 200 parts by weight of the polyester used in Examples 1 and 2 and 32 parts by weight of a mixture of 65 parts by weight of toluylene diisocyanate-(2,4) and 35 parts by weight of toluylene diisocyanate-(2,6), 6 parts by weight of 2,5-dimethyl piperazine and 3 parts by weight of methoxymethylisocyanate as described in Example 1. This product is useful in the production of cross-linked films, coatings and mouldings by conventional methods, optionally with the addition of fillers and catalysts.

EXAMPLE 42

400 parts by weight of a high molecular weight epoxide resin of 2,2-bis-[p-hydroxyphenyl]-propane and epichlorohydrine of the average molecular weight 990, containing secondary hydroxyl groups and terminal epoxide groups and having an OH content of 5.4%, are dissolved in 400 parts by weight of xylene and ethyl glycol acetate (1:1) at 90° C. and reacted with 112 parts by weight of methoxymethylisocyanate in the presence of 0.2 part by weight of the divalent tin salt of 2-ethyl caproic acid at 90° C. within 3 hours. There is obtained an approximately 56% solution of a polyaddition product having terminal epoxide groups and an epoxide equivalent of about 634. By evaporating the solvent at 130° C., highly cross-linked non-melting plastics are obtained either with the addition or without the addition of an inorganic or organic acid as catalyst.

EXAMPLE 43

The procedure of Example 42 is repeated, however 400 parts by weight each of epoxide resins prepared from 2,2-bis-[p-hydroxyphenyl]-propane and epichlorohydrine, having the following average molecular weights and the following epoxide equivalents are used:

(1) $\overline{M}=1858$, epoxide equivalent: 929, percent OH=5.4
(2) $\overline{M}=3480$, epoxide equivalent: 1740, percent OH=5.7
(3) $\overline{M}=5880$, epoxide equivalent: 2940, percent OH=6.1

Upon the reaction of (1), (2) and (3) with 112 parts by weight, 118 parts by weight and 125 parts by weight respectively of methoxymethylisocyanate there are obtained clear solutions of polyaddition products having terminal epoxide groups and epoxide equivalents of 1185, 2250 and 3860 respectively. Upon evaporating the solvent at 130° C. highly cross-linked, non-melting plastics are obtained either with the addition or without the addition of an organic or inorganic acid as catalyst.

EXAMPLE 44

100 parts by weight of a polysilicic acid ester having an OH content of 2%, which was prepared by polymerization of the cyclic silicic acid ester from dimethyl-dichlorosilane and ethylene glycol in the presence of sulfuric acid as catalyst, are dissolved in 200 parts by weight of dioxane and reacted at 70° C. with 10 parts by weight of methoxymethylisocyanate in the presence of 0.3 part by weight of the divalent salt of 2-ethyl-caproic acid. After 3 hours heating at 80° C. the non-reacted methoxymethylisocyanate is converted into di-N-methoxymethyl-butane-diol-diurethane by addition of 3 parts by weight of 1,4-butane-diol. After removing the solvent in a water jet vacuum there is obtained a viscous, N-methylolmethylether group-containing reaction product. By addition of 0.2% p-toluene sulfonic acid to the mixture and heating at 140° C. in a water jet vacuum there is obtained a cross-linked gelatin-like product.

EXAMPLE 45

25 parts by weight of a polyacetal of 2,2,8,8-tetramethyl-2,8-disila-1,4,6-trioxane-cyclooctane of the formula

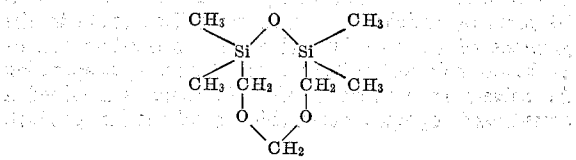

which was prepared with sulfuric acid as catalyst and has an OH content of 3.4%, are reacted in 60 parts by weight of dioxane with 4.9 parts by weight of methoxymethylisocyanate in the presence of 0.3 part by weight of dimethylbenzylamine as catalyst for 2 hours. After removing the dioxane in a water jet vacuum there is obtained a colourless, viscous polyacetal containing N-methylolmethylether end groups. By adding 0.4% p-toluene sulfonic acid to the reaction product and heating to 130° C. in vacuum for 1 hour there is obtained a cross-linked, rubber-elastic product of high tackiness.

EXAMPLE 46

100 parts by weight of a highly branched polyester of phthalic acid and trimethylolpropane, having an OH content of 8%, are dissolved in 100 parts by weight of a mixture of xylene and methylglycol acetate (1:1) at 90° C. and reacted with 41 parts by weight of methoxymethylisocyanate within 3 hours after the addition of 0.2 part by weight of the divalent salt of 2-ethyl-caproic acid. There is obtained a solution of a highly branched polyaddition product of excellent stability in storage, which is clear even at room temperature. By pouring the solution onto supports after the addition of catalytical quantities of p-toluene sulfonic acid there are obtained films which undergo cross-linking upon heating to 100° C. and are insoluble in xylene and methyl glycol acetate.

EXAMPLE 47

100 parts by weight of a polycarbonate which was prepared from 1 mol of diethylcarbonate, 0.5 mol of hydroxyethylated 1,4-butylene glycol and 0.3 mol of trimethylolpropane in the presence of 0.3 part by weight of sodium methylate as catalyst, having an OH content of 3.4%, are reacted at 70° C. with 18 parts by weight of methoxymethylisocyanate. By adding 0.4% p-toluene sulfonic acid to the polyaddition product and heating to 130° C. for 1 hour in a water jet vacuum there is obtained a cross-linked rubber-elastic product.

EXAMPLE 48

50 parts by weight of a condensation product of 1 mol of hexamethylol-melamine and 4 mols of 2,2-dimethylpropane-diol-(1,3) are dissolved in 80 parts by weight of dioxane and reacted with 16 parts by weight of methoxymethylisocyanate in the presence of 0.2 part by weight of dimethylbenzylamine at 70° C. for 2 hours. By evaporating the solvent in vacuum and heating to 130° C. for 3 hours there is obtained a transparent, glasslike, cross-linked moulding which is insoluble in all conventional solvents.

EXAMPLE 49

60 parts by weight of a resin of aniline and formaldehyde (molar ratio of aniline and $CH_2O$ 1:1) are dissolved in 80 parts by weight of γ-butyrolactone and reacted with 23 parts by weight of methoxymethylisocyanate at 80° C. for 2 hours. After evaporation of the butyrolactone in vacuum there is obtained a viscous, golden-yellow resin. After heating at 145° C. under 0.5 mm. Hg for another 2 hours there is obtained a cross-linked, amber-coloured plastic.

EXAMPLE 50

80 parts by weight of a condensation product prepared at pH 5.5 from 1 mol of resorcinol, 4 mols of formaldehyde and 2 mols of 1,4-butylene glycol, are dissolved in 100 parts by weight of γ-butyrolactone and reacted with 30 parts by weight of methoxymethylisocyanate in the presence of 0.2 part by weight of the divalent salt of 2-ethyl-caproic acid at 70° C. for 2 hours. By evaporating the solvent in vacuum at 130° C. there is obtained a cross-linked, opaque, non-melting condensation product.

EXAMPLE 51

15 parts by weight of a Polyschiff base having amino end groups, prepared from 1 mol of terephthal-dialdehyde and 1.8 mols of hexamethylenediamine, are dissolved in 40 parts by weight of dimethylformamide and reacted with 20 parts by weight of methoxymethylisocyanate at 85° C. for 1 hour. By evaporating the solvent in vacuum and raising the temperature of the melt to 140° C., a cross-linked condensation product is obtained after 2 hours, which is insoluble in dimethylformamide.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. High molecular weight, cross-linkable polymers prepared by the process which comprises reacting an organic compound containing active hydrogen atoms, which are reactive with NCO groups and are determinable by the Zerewitinoff test, said organic compound having a molecular weight of at least 600 with an alkoxymethyl isocyanate.

2. The polymers of claim 1 wherein the alkoxymethyl isocyanate is methoxymethyl isocyanate.

3. The polymers of claim 1 wherein an excess of the alkoxymethyl isocyanate is used and after completion of the addition reaction a member selected from the group consisting of polyamines, polyhydric alcohols and amino alcohols is added to react with the excess.

References Cited

UNITED STATES PATENTS

| | | | |
|---|---|---|---|
| 2,340,757 | 2/1944 | Kaase et al. | 260—453 |
| 2,466,404 | 4/1949 | Fowler et al. | 260—77.5 |
| 2,592,263 | 4/1952 | Frame | 260—117 |
| 2,626,278 | 1/1953 | Wystrach et al. | 260—453 |
| 3,205,284 | 9/1965 | McCulloch | 260—858 |

FOREIGN PATENTS

| | | |
|---|---|---|
| 918,777 | 10/1954 | Germany. |
| 1,034,693 | 6/1966 | Great Britain. |
| 1,205,087 | 11/1965 | Germany. |
| 1,337,602 | 8/1963 | France. |

DONALD E. CZAJA, Primary Examiner

H. S. COCKERAM, Assistant Examiner

U.S. Cl. X.R.

260—2, 18, 46.5, 5.7, 65, 67.6, 77.5, 78, 80, 67, 117, 119, 212